United States Patent
Tamura

(10) Patent No.: US 9,557,823 B1
(45) Date of Patent: Jan. 31, 2017

(54) KEYBOARD CUSTOMIZATION ACCORDING TO FINGER POSITIONS

(71) Applicant: Amazon Technologies, Inc., Reno, NV (US)

(72) Inventor: Mark Steven Tamura, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 15 days.

(21) Appl. No.: 13/872,641

(22) Filed: Apr. 29, 2013

(51) Int. Cl.
*G06F 3/02* (2006.01)

(52) U.S. Cl.
CPC ........................................ *G06F 3/02* (2013.01)

(58) Field of Classification Search
None
See application file for complete search history.

(56) References Cited

U.S. PATENT DOCUMENTS

| | | | |
|---|---|---|---|
| 2012/0242581 A1* | 9/2012 | Laubach | G06F 3/04812 345/168 |
| 2012/0306767 A1* | 12/2012 | Campbell | G06F 3/04886 345/173 |
| 2013/0088439 A1* | 4/2013 | Shih et al. | 345/173 |
| 2013/0127729 A1* | 5/2013 | Mosby | G06F 3/04883 345/168 |
| 2013/0207920 A1* | 8/2013 | McCann | G06F 3/0488 345/173 |
| 2013/0257732 A1* | 10/2013 | Duffield | G06F 3/0236 345/168 |
| 2014/0267044 A1* | 9/2014 | Andersen | 345/168 |
| 2014/0364222 A1* | 12/2014 | Tanaka et al. | 463/31 |

FOREIGN PATENT DOCUMENTS

WO  WO 2012048380 A1 *  4/2012

OTHER PUBLICATIONS

WO 2012048380 A1, Lau H et al., Virtual Keyboard, Apr. 19, 2012.*

* cited by examiner

*Primary Examiner* — Jason Olson
*Assistant Examiner* — Krishna Neupane
(74) *Attorney, Agent, or Firm* — Sutherland Asbill & Brennan LLP

(57) ABSTRACT

Systems, devices, and techniques are provided for customization of a layout of keys based at least on position of a finger of an end-user of user equipment. The customization can be implemented dynamically in response to changes in actions associated with interaction between end-users and the user equipment. A customized layout of keys of a keyboard layout associated with the user equipment can be leveraged for implementation of a typing technique.

22 Claims, 11 Drawing Sheets

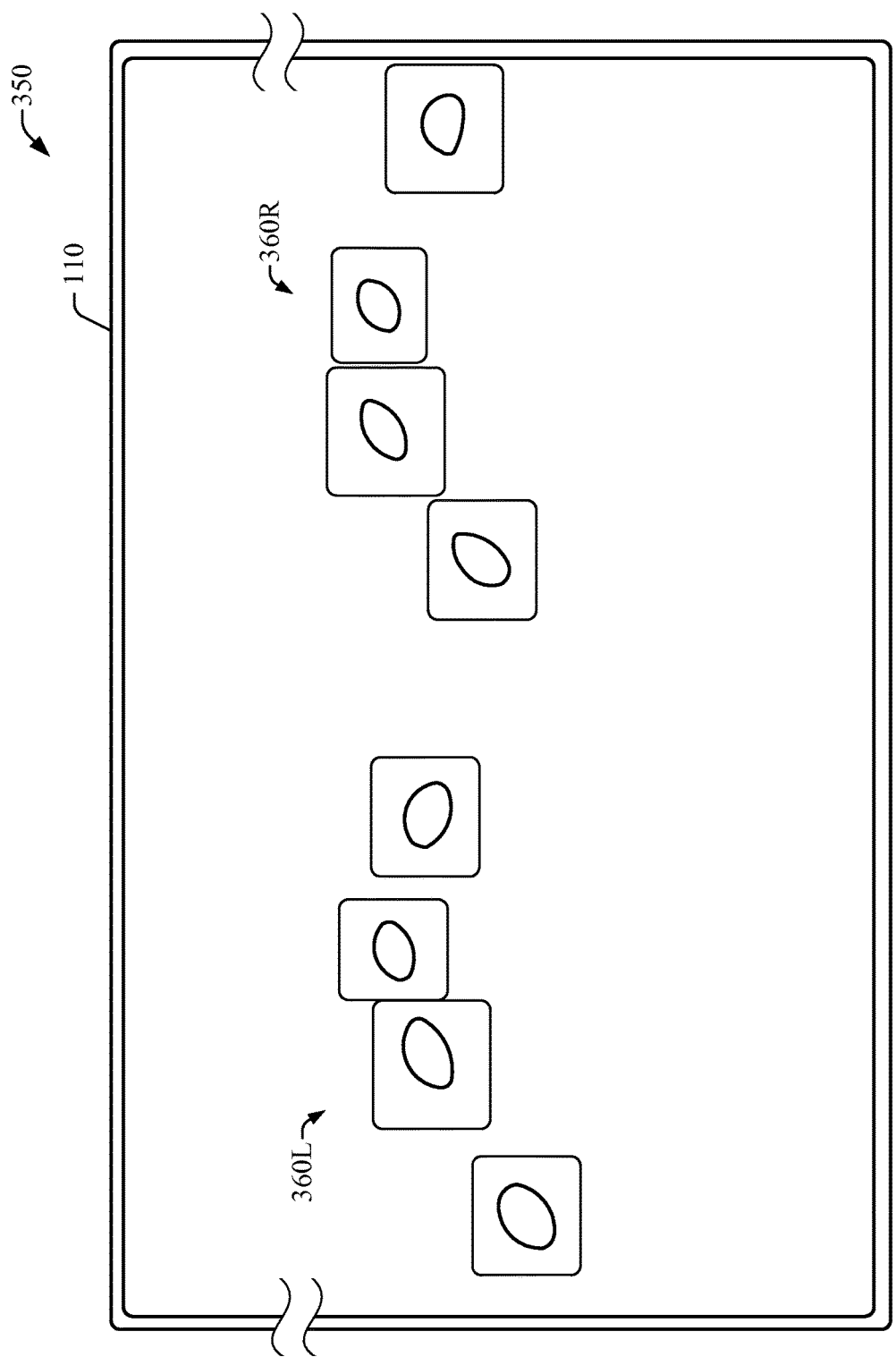

KEYBOARD CUSTOMIZATION ACCORDING TO FINGER POSITIONS

BACKGROUND

Conventional physical or virtual typing keyboards typically include keys or tiles having a predetermined size located at fixed positions within a typing keyboard layout. The keys are generally arranged in a grid-like configuration. Users of such keyboards generally possess different hand morphologies and vision capabilities. Accordingly, use of conventional physical and virtual keyboards may present difficulties for such users.

BRIEF DESCRIPTION OF THE DRAWINGS

The accompanying drawings form part of the disclosure and are incorporated into the subject specification. The drawings illustrate example embodiments of the disclosure and, in conjunction with the present description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as being limited to the implementations set forth herein. Like numbers refer to like elements throughout.

FIGS. 3A-3B illustrate other example finger press configurations in accordance with one or more aspects of the disclosure.

DETAILED DESCRIPTION

Figure 1:
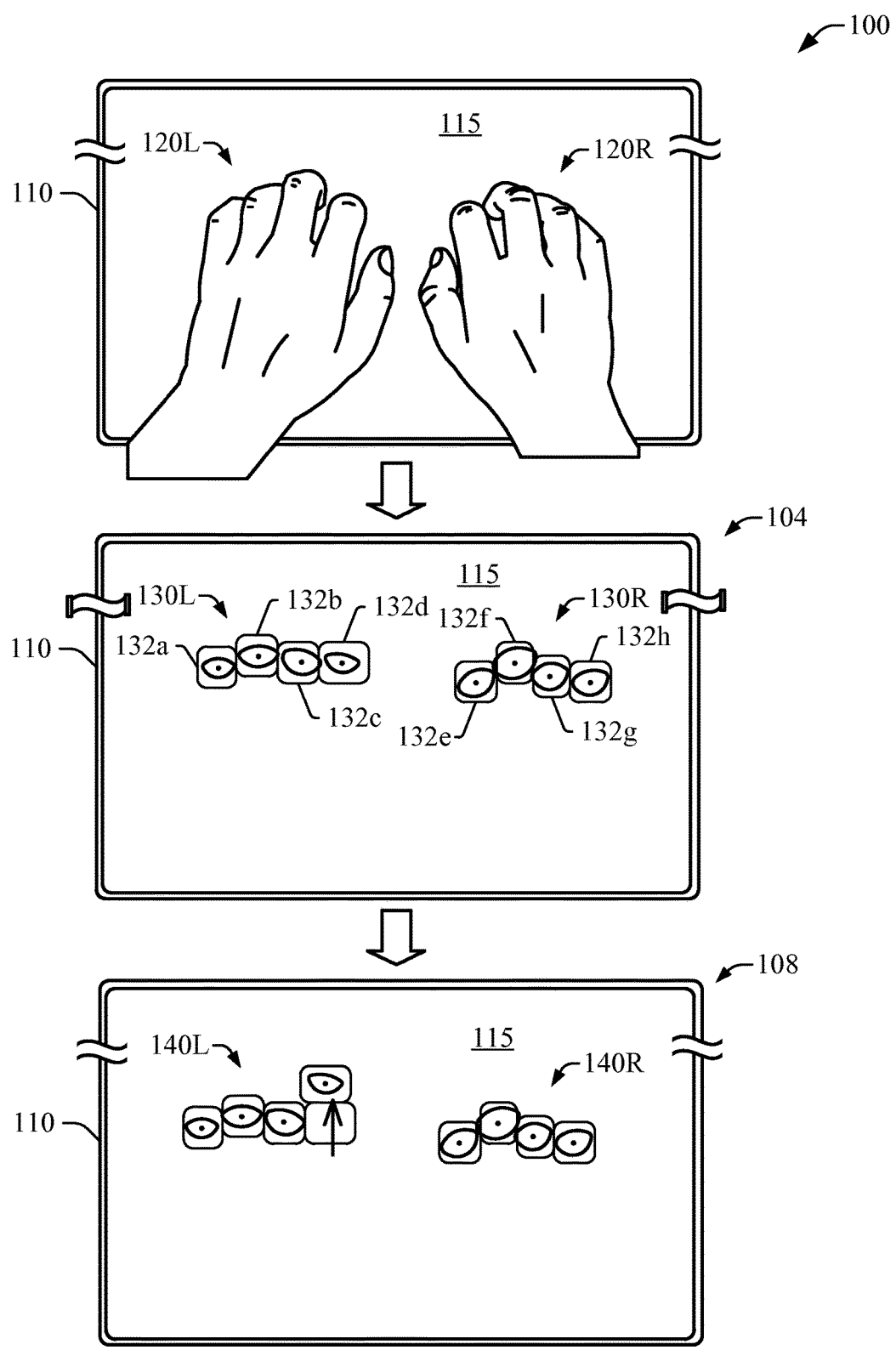
FIG. 1 illustrates an example functional environment in accordance with one or more aspects of the disclosure.

The disclosure recognizes and addresses, in at least one aspect, the lack of customization of virtual keyboards in user equipment based at least on features specific to an end user. In particular, but not exclusively, the disclosure recognizes and addresses the issue of conventional physical or virtual keyboards having keys that are uniform in size and that are placed at fixed positions in a keyboard typing layout. The fixed sizes and positions of keys in a conventional physical or virtual keyboard commonly fail to adequately address the wide range of hand sizes, individual finger positions, and/or hand orientations possessed by a wide range of end users. In addition, the disclosure recognizes that in certain user equipment, such as mobile devices with limited display real estate, conventional virtual keyboards may fail to adequately accommodate keyboard layouts. The disclosure further recognizes that the lack of physical buttons in a virtual keyboard may make it difficult for visually impaired users to correctly position their hands and/or fingers on such a keyboard.

As described in greater detail below, the disclosure provides various embodiments for customization of a keyboard layout associated with a keyboard. In the present disclosure, a keyboard can comprise information (e.g., digital information, such as data or metadata, and/or analogic information) configured to represent or otherwise indicate a plurality of keys or tiles arranged in a specific keyboard layout. Specific portions of such information and/or a rendering thereof may be referred to as indicia or keys. The keyboard layout can be representative or otherwise indicative of the typical arrangement of keys of a common keyboard that typically is included in user equipment, such as a tablet computer, a smartphone, a gaming console, a navigation console, or the like. In addition or in the alternative, the keyboard layout (which herein also may be referred to as the keyboard) can be indicative or otherwise representative of any arrangement of input source keys arranged in a specific spatial configuration that can permit an end-user to provide input (e.g., information) via such keys to the user equipment or other computing device that includes the keyboard layout (or keyboard). In certain aspects of the disclosure, a keyboard layout can be customized based at least in part on an end-user's finger positions on a surface (such as a display surface) associated with user equipment operated or otherwise manipulated by the end-user. Each of the finger positions can have associated thereto a respective point of contact on the surface. Finger positions or associated points of contact on a surface can be utilized to customize a keyboard layout as described herein. The disclosure also provides typing techniques that utilize or otherwise leverage a keyboard layout customized in accordance with various aspects described herein.

In certain embodiments, the disclosure can detect a set of finger positions on a surface of a display of user equipment. The finger positions may be associated with a typing action via which an end-user may interact with the user equipment. An arrangement (e.g. a spatial configuration or structure) of the set of finger positions can be determined and, based at least on the determined arrangement, the disclosure can generate a layout of keys of a keyboard (or a keyboard layout). In certain aspects, such a layout can be generated dynamically in response to changes in the set of finger positions, where the changes can originate from a change in the end-user that interacts with the user equipment and/or a relocation of one or more hands of the end-user. In addition, the layout of keys of the keyboard can be utilized or otherwise leveraged in scenarios in which a keyboard layout is likely to be poorly perceived (e.g., the end-user is visually impaired). In such scenarios, the disclosure provides a typing technique that relies upon a determination of relative arrangements of finger positions associated with a series of typing actions by an end-user during typing. While various embodiments of the disclosure are illustrated in the context of a keyboard layout, other layouts of keys (e.g., numeric keypads or media assets, such as pictures or thumbnails) can be customized in accordance with one or more aspects of the disclosure.

In connection with the drawings, FIG. 1 illustrates an example functional environment 100 for customization of a keyboard layout in accordance with one or more aspects of the disclosure. In such an environment, an end-user can interact with user equipment 110 via a display surface 115 of the user equipment 110 through one or more actions (which herein can be referred to as typing actions). The user equipment 110 can be embodied in or can comprise a computing device having various computing resources, such as one or more processors and one or more memory devices, and various communication resources, such as communication devices (e.g., a system bus, a memory bus, or the like) and/or input/output interface(s). The user equipment 110 can be embodied in wireless computing devices (e.g., mobile computing devices, including wearable computing devices) or tethered computing devices.

As illustrated, as part of an example typing action, the end-user can place a first hand (e.g., left hand 120L) and a second hand (e.g., right hand 120R) in contact with the display surface 115. In response to such an action, the user equipment 110 can detect a first plurality of points of contact 130L on the display surface 115 associated with the typing action corresponding to the first hand (e.g., hand 120L) and a second plurality of points of contact 130R on the display surface 115 associated with the typing action corresponding to the second hand (e.g., hand 120R). It should be appreciated that, in certain scenarios, the first and second hands can be placed in contact with the display surface in sequence or substantially simultaneously. In one aspect, each of the first plurality of points of contact is associated with a respective finger of the first hand (e.g., hand 120L) and each of the second plurality of points of contact is associated with a respective finger of the second hand (hand 120R). In certain embodiments, a typing action can be embodied in or can comprise an eight-finger press, where the first plurality of points of contact 130L has four points of contact (e.g., four pressure points) and the second plurality of points of contact 130R also has four points of contact (e.g., four pressure points). In certain embodiments, the first plurality of points of contact 130L can be associated with a home row of keys in a predetermined keyboard layout, such as the keys "A," "S," "D," and "F," in a QWERTY keyboard layout, and the second plurality of points of contact 130R can be associated with another home row of keys in the predetermined keyboard layout, such as the keys "H," "J," "K," and "L" in the QWERTY keyboard layout. In other embodiments, the typing action can be embodied in or can comprise a finger press having a different press degree: a two-finger press, a three-finger press, a four-finger press, a five-finger press, a six-finger press, a seven-finger press, a nine-finger press, or a ten-finger press. It should be appreciated that the press degree refers to a number N of fingers that are in contact with a surface, such as the display surface 115, where N is a natural number and 10≥N>1. Accordingly, the foregoing finger presses can be collectively referred to as N-finger presses.

Based on the first and second pluralities of points of contact, the user equipment 110 can generate a customized layout of indicia that can be indicative or otherwise representative of a keyboard layout associated with the user equipment 110 or a software application executed therein. At least a portion of such a layout can be rendered via the display surface 115. For example, as illustrated in diagram 104, indicia—represented as rectangular blocks 132a-132h—indicative of each of the first plurality of points of contact 130L and each of the second plurality of points of contact 130R can be rendered at the display surface 115. In addition, as the end-user types and thus moves a digit or finger as illustrated with an arrow in diagram 108 to a new point of contact, indicia indicative of one or more tiles (e.g., key(s)) in the keyboard layout determined to be associated with the new point of contact can be rendered at the display surface 115. It should be appreciated that the indicia that are illustrated in FIG. 1 can be rendered for the benefit of the user and also can be rendered within a content processing software application (e.g., a word processing application, a computer-assisted design application, a content publishing application, or the like) executing on the user equipment 110.

Figure 2:
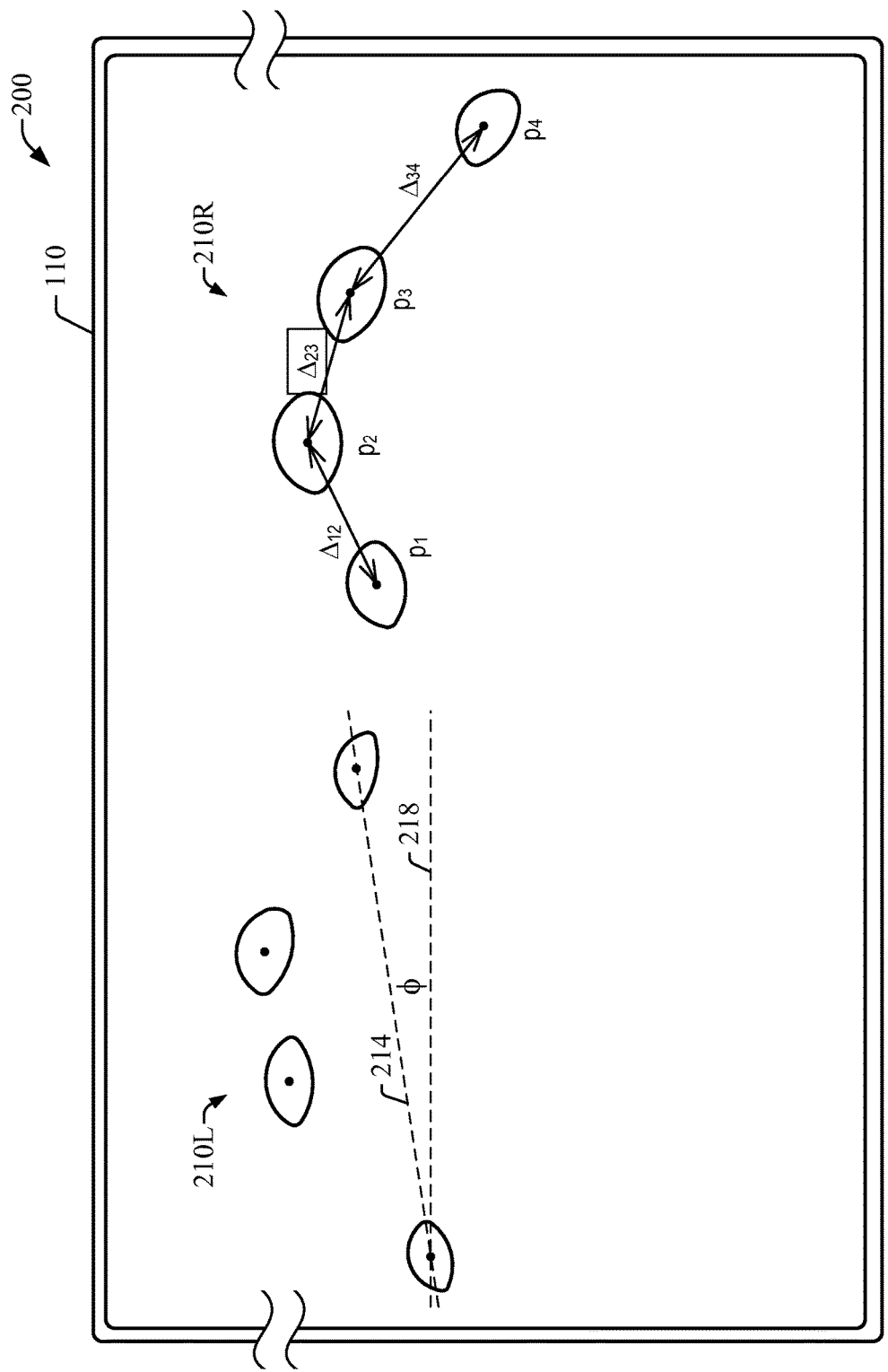
FIG. 2 illustrates an example finger press configuration in accordance with one or more aspects of the disclosure.

In certain embodiments, as part of generating the customized layout of indicia based at least on the plurality of contact points that are detected, the user equipment can determine a first set of one or more distances between at least two points of contact of the first plurality of points of contact 130L. In addition, the user equipment 110 can determine a second set of one or more distances between at least two points of contact of the second plurality of points of contact 130R. As an illustration, FIG. 2 presents a diagram 200 of an example eight-finger press having a first plurality of points of contact 210L and a second plurality of points of contact 210R. As described herein, the user equipment 110 can determine at least one distance between one or more pairs of points of contact in each of such pluralities of points of contact. For example, the distance $\Delta_{12}$ between a first point of contact $p_1$ and a second point of contact $p_2$ can be determined. Similarly, other distances (e.g., $\Delta_{23}$, $\Delta_{34}$, etc.) between pairs of points of contacts $p_1$, $p_2$, $p_3$, and $p_4$ also can be determined. In addition or in the alternative, in one or more of such embodiments, the user equipment 110 can determine an angle between a line connecting two points of contact of the first plurality of points of contact and a line substantially parallel to an edge of the display surface 115. For example, the user equipment 110 can determine the angle $\phi$ between line 214 connecting the furthermost points of contact in the plurality of points of contact 210L and line 218 parallel to the bottom edge of the display surface 115. It should be appreciated that the angle $\phi$ can be formed between the pinky finger and the pointer finger of an end-user and can represent a rotation of the end-user's hand (e.g., hand 120L) with respect to an edge of the display surface 115.

It should be appreciated that, in one aspect, determination of such geometrical arrangement of the first plurality of contact points 210L and the second plurality of contact points 210R can determine an arrangement of each or both of such pluralities of points of contact. Determination of such arrangement can permit customization of the layout of indicia indicative of or otherwise representative of a typewriter keyboard layout (or keyboard layout) associated with the user equipment 110 or a content processing software application executing thereon. To at least such an end, in one aspect, the user equipment 110 can determine a first configuration of a first plurality of indicia that is indicative of a first plurality of keys associated with a first portion of the keyboard layout. For instance, the first portion of the keyboard layout can be or can comprise a home row associated with the keyboard layout (e.g., the keys "A," "S," "D," and "F," in a QWERTY keyboard layout). In one aspect, the user equipment 110 can determine a respective size of each of the first plurality of indicia based at least in part on a first set of one or more distances between one or more pairs of points of contact of the first plurality of points of contact 210L. In addition or in the alternative, in one or more embodiments, the user equipment 110 can determine an angle between a line connecting two points of contact of the first plurality of points of contact 21 OR and the line substantially parallel to an edge of the display surface 115 (e.g., line 218). Moreover, the user equipment 110 can determine a relative orientation of at least one indicia of the first plurality of indicia with respect to at least one other indicia of the plurality of indicia based at least in part on the angle that is determined.

It should be appreciated that in embodiments in which a layout of indicia representative of key sizes and/or positions can be dynamically generated based on hand position and/or size, it is possible that individual indicia may overlap (e.g., conflicts may exist between indicia representative of left hand keys and indicia representative of right hand keys in a keyboard layout). Such overlap may occur when the left hand and right hand of an end-user are placed in close proximity to each other during typing actions. For example, the middle home row keys "G" and "H" may overlap in certain scenarios. Similarly, in a scenario in which one or both hands are rotated in or out, the top or bottom middle keys may overlap. It should further be appreciated that close proximity of an end-user's hands during typing is likely in scenarios involving a device with limited display area.

In addition to determining a first configuration of a first plurality of indicia, the user equipment 110 can determine a second configuration of a second plurality of indicia that is indicative of or otherwise representative of a second plurality of keys associated with a second portion of a keyboard layout. For instance, the second portion of the keyboard layout can be or can comprise a home row associated with the keyboard layout (e.g., the keys "J," "K," "L," and ";" in a QWERTY keyboard layout). In one aspect, in order to determine the second configuration, the user equipment 110 can determine a respective size of each of the second plurality of indicia based at least in part on the second set of one or more distances. In addition or in the alternative, in one or more embodiments, the user equipment 110 can determine an angle between a line connecting two points of contact of the second plurality of points of contact 210R and the line substantially parallel to an edge of the display surface 115 (e.g., line 218). Moreover, the user equipment 110 can determine a relative orientation of at least one indicia of the second plurality of indicia with respect to at least one other indicia of the plurality of indicia based at least in part on the angle that is determined.

In certain scenarios, for example, the user equipment 110 can render the first plurality of indicia and the second plurality of indicia on a display surface, wherein the first plurality of indicia in combination with the second plurality of indicia represents a complete layout of the typing keyboard layout, such as the layout of a QWERTY keyboard or a QWERTZU keyboard.

Figure 3A:
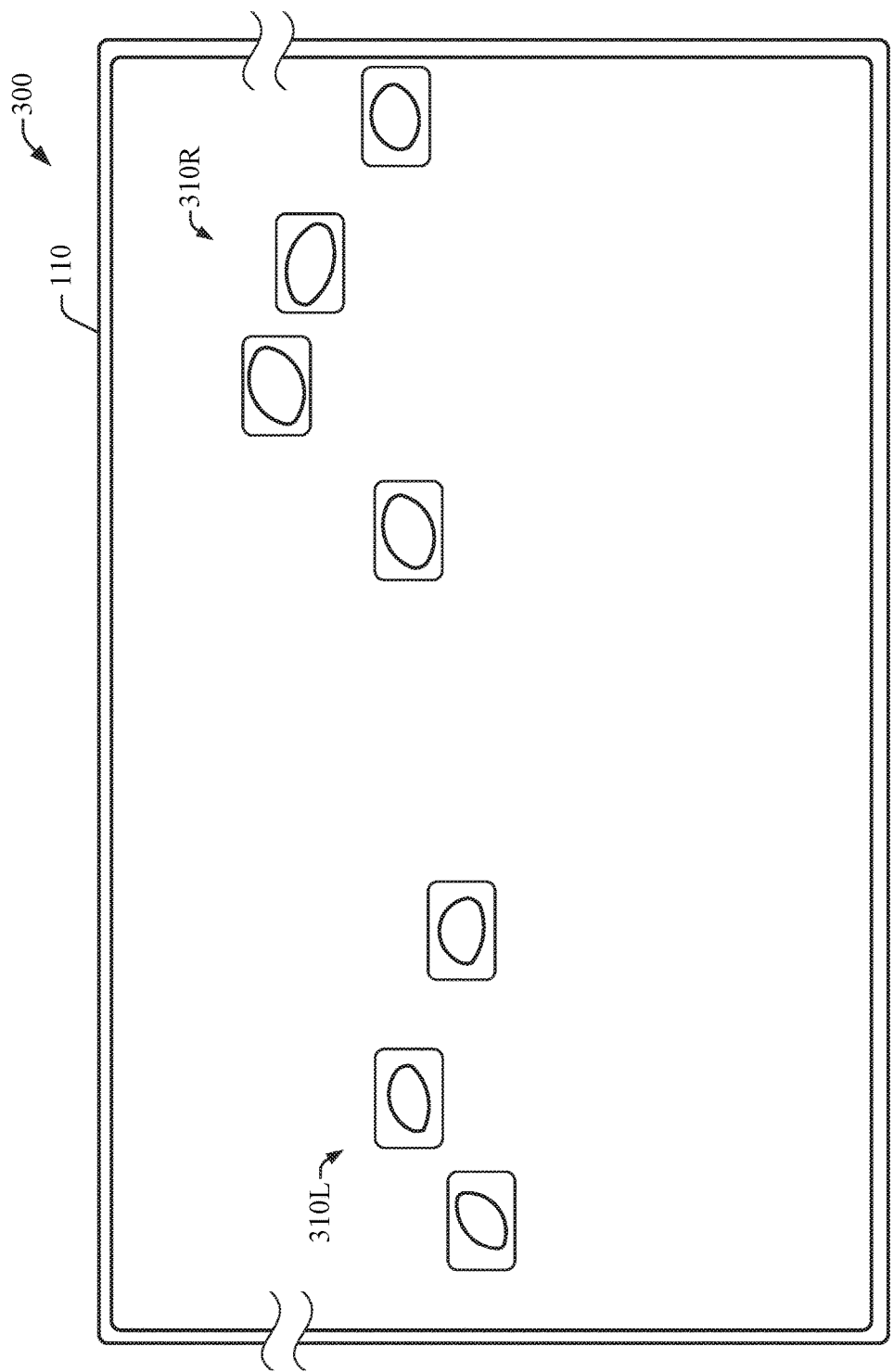

It should be appreciated that, in one aspect, the described customization of a layout of indicia indicative or representative of a keyboard layout can be specific to the morphology of one hand or both of an end-user's hands and/or to the manner in which the end-user interacts with the display surface 115. In one aspect, based on the determined arrangement of points of contacts, the described customization can seamlessly accommodate the size of the end-user's hands, via the determination of distances between the points of contact or otherwise established by the user equipment 110. In addition, the described customization also can account for angular rotation of one or more hands of the end-user. For example, the end-user can place both hands onto the display surface 115 with an inwards rotation, e.g., the line connecting the point of contact associated with the pinky and the point of contact associated with the pointer finger extends below the line substantially parallel to the bottom edge of the display surface 115. In addition, or in the alternative, at least one of the end-user's hands can be rotated outwards, e.g., the line connecting the point of contact associated with the pinky and the point of contact associated with the pointer finger extends above the line substantially parallel to the bottom edge of the display surface 115. As an illustration, FIGS. 3A-3B depict different arrangements of points of contact associated with different typing actions of different end-users, and the associated customized indicia that may be generated based thereon.

Figure 4:
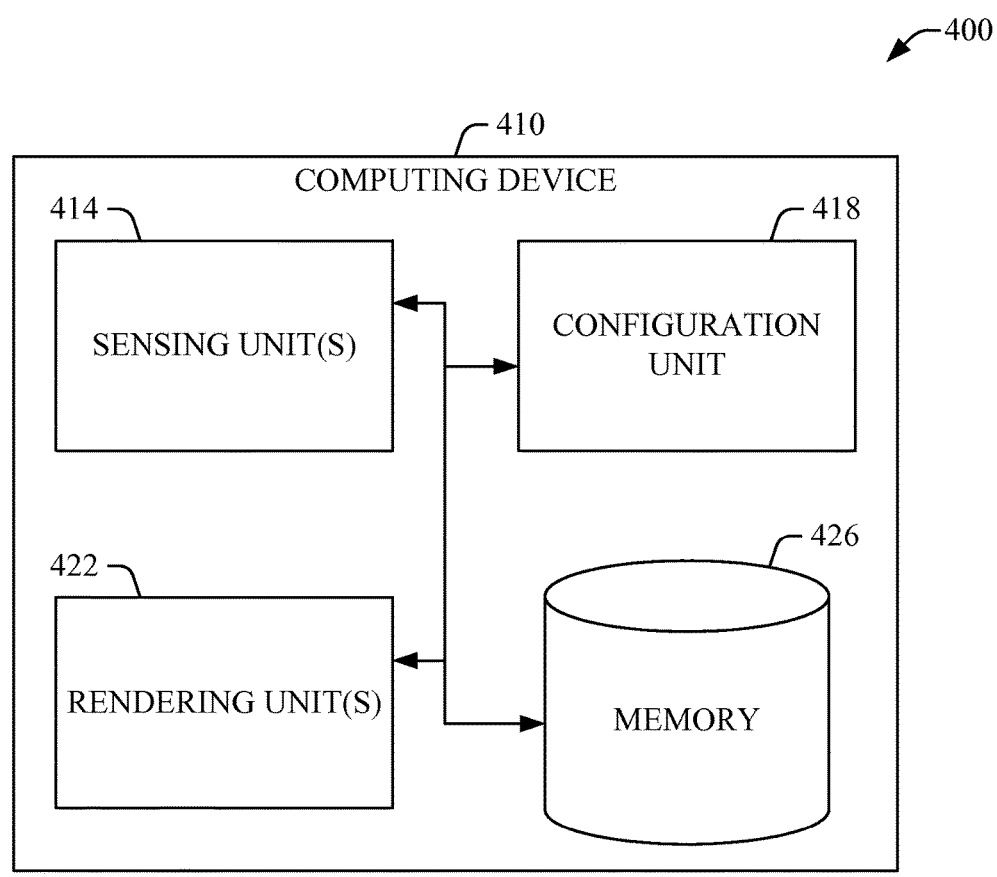
FIG. 4 illustrates an example computing device in accordance with one or more aspects of the disclosure.

FIG. 4 illustrates a block diagram of an example embodiment 400 of a computing device 410 in accordance with one or more aspects of the disclosure. The computing device 410 can embody or can comprise the user equipment 110 described herein. As illustrated, the computing device 410 can include one or more sensing units 414 that can detect or otherwise acquire information indicative of one or more points of contacts on a surface functionally coupled to the device. The sensing unit(s) 414 can include pressure sensors, capacitive sensors, inductive sensors, or the like that permit detecting a typing action from an end-user and, in response to such detection, determining or otherwise establishing one or more points of contact at such surface. The configuration unit 418 can receive information indicative or otherwise representative of the plurality of points of contact (e.g., pressure points) at the surface functionally coupled to the computing device 110, and can determine an arrangement of the plurality of points of contact. In addition, in accordance with one or more aspects described herein, the configuration unit 418 can determine a layout of a plurality of indicia based at least on the arrangement of the one or more points of contact. Such layout can be determined in accordance with various aspects described herein by evaluating one or more distances between two or more pairs of points of contact of the plurality of points of contact. In one aspect, each of the plurality of indicia in the layout can be associated with respective predetermined content, such as a specific letter in a keyboard layout.

The computing device 410 also can comprise one or more rendering units 422. In one aspect, at least one of the rendering unit(s) 422 can include a display device (or display) that contains a display surface (such as display surface 115). The rendering unit 422 can render at least a portion of the plurality of indicia. In certain embodiments, the at least one rendering unit 422 can display at least the portion of the plurality of indicia at a rendering surface (e.g., a multi-layer surface containing a plurality of pixels) that is coupled to the display surface.

As illustrated, the computing device 410 includes a memory device 426 (also referred to as memory 426) that can comprise information associated with customization of a layout of indicia (e.g., a keyboard layout) as described herein. The memory 426 can include one or more rules to define a size (e.g., height and/or width) of indicia indicative of a tile or key associated with an element of a keyboard layout. In addition, or in the alternative, the memory 426 can include programming logic (e.g., instructions) that, in response to execution, permits determination of a location of a point of contact (e.g., a pressure point) in relation to one or more other points of contact. The memory 426 also can include a set of one or more predetermined keyboard layouts, such as a QWERTY keyboard layout, a QWERTZU keyboard layout, combinations thereof, or the like, which can permit the configuration unit 418 to generate a layout of indicia according to a predetermined keyboard layout.

Figure 5:
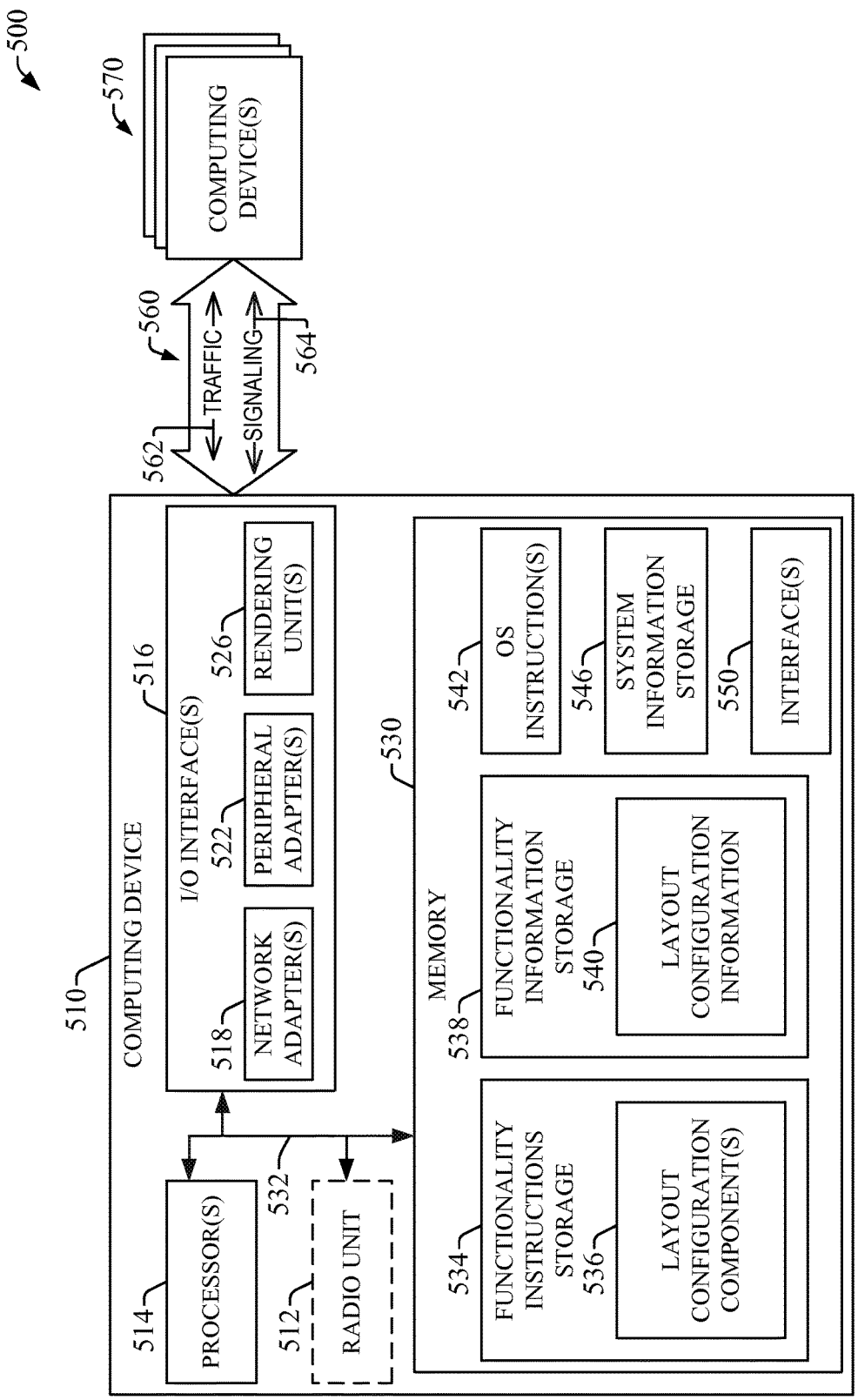
FIG. 5 illustrates an example operational environment in accordance with one or more aspects of the disclosure.

FIG. 5 illustrates a block diagram of an example operational environment 500 for customization of a keyboard layout in accordance with one or more aspects of the disclosure. The example operational environment is merely illustrative and is not intended to suggest or otherwise convey any limitation as to the scope of use or functionality of the operating environment's architecture. In addition, the illustrative operational environment 500 depicted in FIG. 5 should not be interpreted as having any dependency or requirement relating to any one or combination of components illustrated as part of the operational environment 500. The operational environment 500 comprises a computing device 510 which, in various embodiments, can correspond to the computing device 410.

The operational environment 500 represents an example implementation of the various aspects or features of the disclosure in which the processing or execution of operations described in connection with the customization of a layout or configuration of indicia indicative of otherwise representative of a keyboard layout disclosed herein can be performed in response to execution of one or more software components at the computing device 510. It should be appreciated that the one or more software components can render the computing device 510, or any other computing device that contains such components, a particular machine for customization of a layout or configuration of indicia (e.g., a keyboard layout) as described herein, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods described herein, such as the example methods presented in FIGS. 8-9. For instance, to embody one such method, at least a portion of the computer-accessible instructions can be persisted (e.g., stored, made available, or stored and made available) in a computer storage non-transitory medium and executed by a processor. The one or more computer-accessible instructions that embody a software component can be assembled into one or more program modules that can be compiled, linked, and/or executed at the computing device 510 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 510 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the customization of a layout of indicia (e.g., a keyboard layout) described herein can comprise personal computers; server computers; laptop devices; handheld computing devices, such as mobile tablets; wearable computing devices; and multiprocessor systems. Additional examples can include set-top boxes, programmable consumer electronics, network PCs, minicomputers, mainframe computers, blade computers, programmable logic controllers (PLCs), distributed computing environments that comprise any of the above systems or devices, or the like.

As illustrated, the computing device 510 can comprise one or more processors 514, one or more input/output (I/O) interfaces 516, one or more memory devices 530 (herein referred to generically as memory 530), and a bus architecture 532 (also termed bus 532) that functionally couples various functional elements of the computing device 510. In certain embodiments, the computing device 510 can include, optionally, a radio unit 512. The radio unit 512 can include one or more antennas and a communication processing unit that can permit wireless communication between the computing device 510 and another device, such as one of the computing device(s) 570. The bus 532 can include at least one of a system bus, a memory bus, an address bus, or a message bus, and can permit exchange of information (data, metadata, and/or signaling) between the processor(s) 514, the I/O interface(s) 516, and/or the memory 530, or respective functional elements therein. In certain scenarios, the bus 532 in conjunction with one or more internal programming interfaces 550 (also referred to as interface(s) 550) can permit such exchange of information. In scenarios in which processor(s) 514 include multiple processors, the computing device 510 can utilize parallel computing.

The I/O interface(s) 516 can permit communication of information between the computing device and an external device, such as another computing device, e.g., a network element or an end-user device. Such communication can include direct communication or indirect communication, such as exchange of information between the computing device 510 and the external device via a network or elements thereof. As illustrated, the I/O interface(s) 516 can comprise one or more of network adapter(s) 518, peripheral adapter(s) 522, and rendering unit(s) 526. Such adapter(s) can permit or facilitate connectivity between the external device and one or more of the processor(s) 514 or the memory 530. For example, the peripheral adapter(s) 522 can include a group of ports, which can comprise at least one of parallel ports, serial ports, Ethernet ports, V.35 ports, or X.21 ports, wherein parallel ports can comprise General Purpose Interface Bus (GPIB), IEEE-1284, while serial ports can include Recommended Standard (RS)-232, V.11, Universal Serial Bus (USB), FireWire or IEEE-1394.

In one aspect, at least one of the network adapter(s) 518 can functionally couple the computing device 510 to one or more computing devices 570 via one or more traffic and signaling pipes 560 that can permit or facilitate exchange of traffic 562 and signaling 564 between the computing device 510 and the one or more computing devices 570. Such network coupling provided at least in part by the at least one of the network adapter(s) 518 can be implemented in a wired environment, a wireless environment, or a combination of both. The information that is communicated by the at least one of the network adapter(s) 518 can result from implementation of one or more operations in a method of the disclosure. Such output can include any form of visual representation, including, but not limited to, textual, graphical, animation, audio, tactile, or the like. In certain scenarios, each of the computing device(s) 570 can have substantially the same architecture as the computing device 510. In addition, or in the alternative, the rendering unit(s) 526 can include functional elements (e.g., lights, such as light-emitting diodes; a display, such as liquid crystal display (LCD), a plasma monitor, a light emitting diode (LED) monitor, an electrochromic monitor; combinations thereof or the like) that can permit control of the operation of the computing device 510, or can permit conveying or revealing the operational conditions of the computing device 510.

In one aspect, the bus 532 represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI)

bus, a PCI-Express bus, a Personal Computer Memory Card Industry Association (PCMCIA) bus, a Universal Serial Bus (USB) and the like. The bus 532, and all buses described herein can be implemented over a wired or wireless network connection and each of the subsystems, including the processor(s) 514, the memory 530 and memory elements therein, and the I/O interface(s) 516 can be contained within one or more remote computing devices 570 at physically separate locations, connected through buses of this form, thereby effectively implementing a fully distributed system.

The computing device 510 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 510, and can comprise, for example, both volatile and non-volatile media, and removable and/or non-removable media. In one aspect, the memory 530 can comprise computer-readable media in the form of volatile memory, such as random access memory (RAM), and/or non-volatile memory, such as read-only memory (ROM).

The memory 530 can comprise functionality instructions storage 534 and functionality information storage 538. The functionality instructions storage 534 can comprise computer-accessible instructions that, in response to execution by at least one of the processor(s) 514, can implement one or more of the functionalities of the disclosure. The computer-accessible instructions can embody or can comprise one or more software components illustrated as layout configuration component(s) 536. In one scenario, execution of at least one component of the layout configuration component(s) 536 can implement one or more of the methods described herein, such as example methods 800 and/or 900. For instance, such execution can cause a processor that executes the at least one component to carry out a disclosed example method. It should be appreciated that, in one aspect, a processor of the processor(s) 514 that executes at least one of the layout configuration component(s) 536 can retrieve information from or retain information in a memory element 540 in the functionality information storage 538 in order to operate in accordance with the functionality programmed or otherwise configured by the layout configuration component(s) 536. Such information can include at least one of code instructions, information structures, or the like. At least one of the one or more interfaces 550 (e.g., application programming interface(s)) can permit or facilitate communication of information between two or more components within the functionality instructions storage 534. The information that is communicated by the at least one interface can result from implementation of one or more operations in a method of the disclosure. In certain embodiments, one or more of the functionality instructions storage 534 and the functionality information storage 538 can be embodied in or can comprise removable/non-removable, and/or volatile/non-volatile computer storage media.

At least a portion of at least one of the layout configuration component(s) 536 or layout configuration information 540 can program or otherwise configure one or more of the processors 514 to operate at least in accordance with the functionality described herein. In one embodiment, the layout configuration component(s) 536 contained in the functionality instruction(s) storage 534 can include the configuration unit 418. It should be recognized that in such an embodiment, hardware or firmware functional elements of the configuration unit 418 and/or the rendering unit(s) 422 can be embodied in suitable components of the computing device 510. For instance, at least one of the processors 514 and at least one of the I/O interface(s) 516 (e.g., a network adapter of the network adapter(s) 518) can embody a rendering unit of the rendering unit(s) 422. One or more of the processor(s) 514 can execute at least one of the layout configuration component(s) 536 and leverage at least a portion of the information in the functionality information storage 538 in order to provide customization of a layout of indicia (e.g., a keyboard layout) in accordance with one or more aspects described herein.

It should be appreciated that, in certain scenarios, the functionality instruction(s) storage 534 can embody or can comprise a computer-readable non-transitory storage medium having computer-accessible instructions that, in response to execution, cause at least one processor (e.g., one or more of processor(s) 514) to perform a group of operations comprising the operations or blocks described in connection with the disclosed methods.

In addition, the memory 530 can comprise computer-accessible instructions and information (e.g., data and/or metadata) that permit or facilitate operation and/or administration (e.g., upgrades, software installation, any other configuration, or the like) of the computing device 510. Accordingly, as illustrated, the memory 530 can comprise a memory element 542 (labeled operating system (OS) instruction(s) 542) that can contain one or more program modules that embody or include one or more operating systems, such as a Windows operating system, Unix, Linux, Symbian, Android, Chromium, or substantially any OS suitable for mobile computing devices or tethered computing devices. In one aspect, the operational and/or architectural complexity of the computing device 510 can dictate a suitable OS. The memory 530 also comprises a system information storage 546 having data and/or metadata that permits or facilitates operation and/or administration of the computing device 510. Elements of the OS instruction(s) 542 and the system information storage 546 can be accessible or can be operated on by at least one of the processor(s) 514.

It should be recognized that while the functionality instructions storage 534 and other executable program components, such as the OS instruction(s) 542, are illustrated herein as discrete blocks, such software components can reside at various times in different memory components of the computing device 510, and can be executed by at least one of the processor(s) 514. In certain scenarios, an implementation of the layout configuration component(s) 536 can be retained on or transmitted across some form of computer-readable media.

The computing device 510 and/or one of the computing device(s) 570 can include a power supply (not shown), which can power up components or functional elements within such devices. The power supply can be a rechargeable power supply, e.g., a rechargeable battery, and it can include one or more transformers to achieve a power level suitable for operation of the computing device 510 and/or one of the computing device(s) 570, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 518) to connect operationally to the conventional power grid. In another aspect, the power supply can include an energy conversion component, such as a solar panel, to provide additional or alternative power resources or autonomy for the computing device 510 and/or at least one of the computing device(s) 570.

The computing device 510 can operate in a networked environment by utilizing connections to one or more remote computing devices 570. As an illustration, a remote computing device can be a personal computer, a portable computer, a server, a router, a network computer, a peer device or other common network node, and so on. As described herein, connections (physical and/or logical) between the computing device 510 and a computing device of the one or more remote computing devices 570 can be made via one or more traffic and signaling pipes 560, which can comprise wireline link(s) and/or wireless link(s) and several network elements (such as routers or switches, concentrators, servers, and the like) that form a local area network (LAN) and/or a wide area network (WAN). Such networking environments are conventional and commonplace in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 570) that are functionally coupled (e.g., communicatively linked or otherwise coupled) through a network having traffic and signaling pipes and related network elements. In a distributed computing environment, in one aspect, one or more software components (such as program modules) can be located in both a local computing device 510 and at least one remote computing device.

Figure 6:
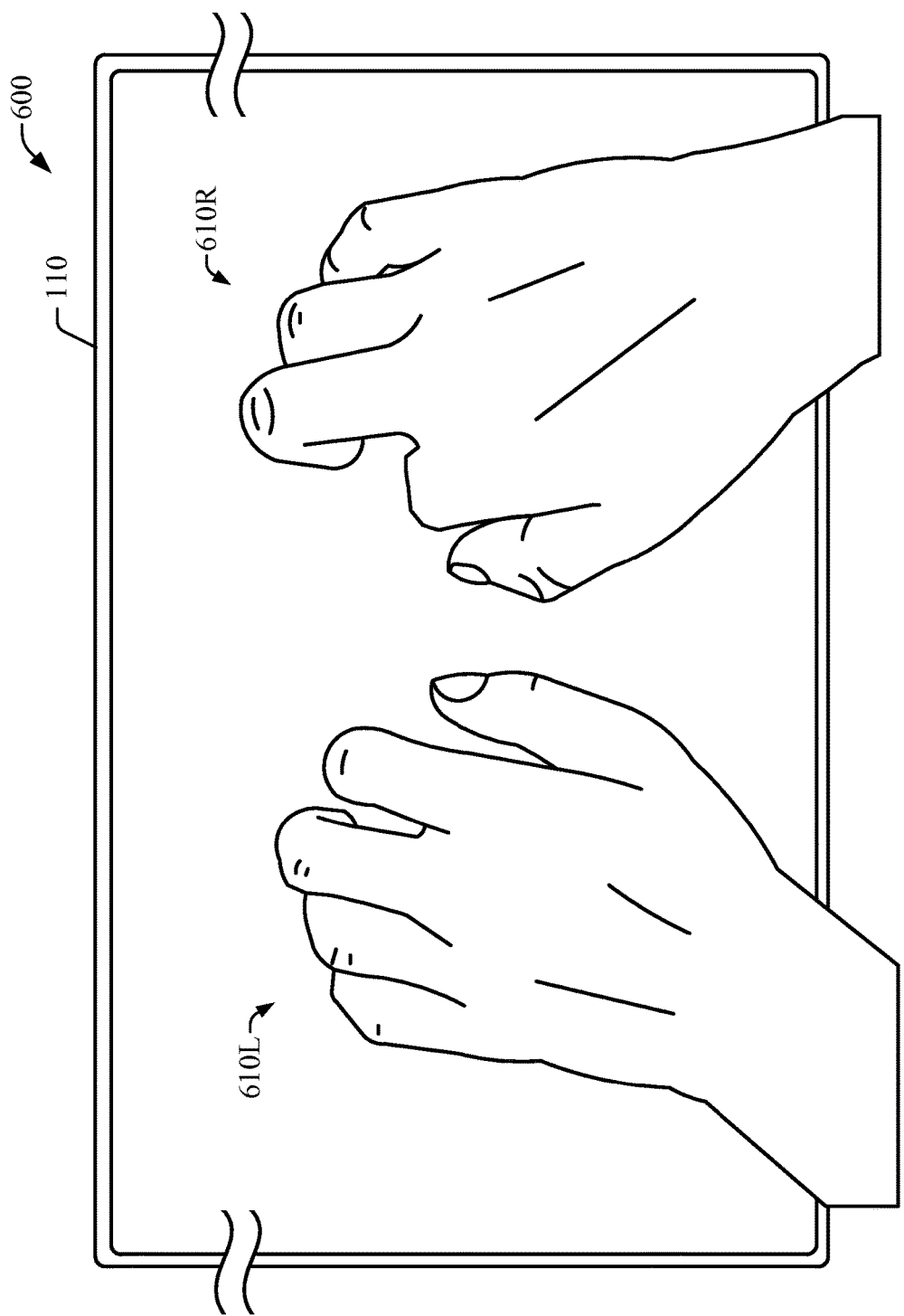
FIG. 6 illustrates another example finger press configuration in accordance with one or more aspects of the disclosure.

As described herein, a layout of indicia representative of a keyboard layout can be customized to substantially any hand morphology and/or typing actions relied upon to interact with a user interface of user equipment. FIG. 6 illustrates a scenario in which an end-user lacks a finger on one hand (e.g., hand 610R). Even in the absence of such a finger, the present disclosure permits generation of customized indicia representative of a virtual keyboard layout for the end-user having hands such as the illustrated hands 610L and 610R.

The disclosure also permits implementation of typing techniques for visually impaired end-users, for example. To at least such an end, in one aspect, a computing device of the disclosure, such as the computing device 410 or the computing device 510, can detect a plurality of points of contact on a display surface. The plurality of points of contact can be associated with a specific N-finger press (with 10≥N>1). In one aspect, a component of the computing device can identify specific hand(s) and/or finger(s) associated with the N-finger press. For example, in an embodiment in which the computing device is embodied in the computing device 410, the configuration unit 418 can acquire or otherwise receive information indicative of the N-finger press, and can identify one or more hands associated with the N-finger press. In addition, in certain implementations, the configuration unit 418 can identify at least one finger associated with the hand that is identified. In response to such detection, the computing device 410 can generate a layout of indicia indicative of a keyboard layout (e.g., a QWERTY layout or a QWERTZU layout) based on a predetermined selection of the keyboard layout. In addition, the computing device 410 can determine or configure a generalized home row for the typing technique, where such home row can include a subset of the plurality of points of contact associated with a specific hand, e.g., hand 610L. The generalized home row can include a conventional home row, such as one of the QWERTY home rows: "A," "S," "D," and "F," or it can comprise any finite set of predetermined characters (e.g., umlaut characters and non-umlaut characters; foreign language characters, or the like).

Figure 7A:
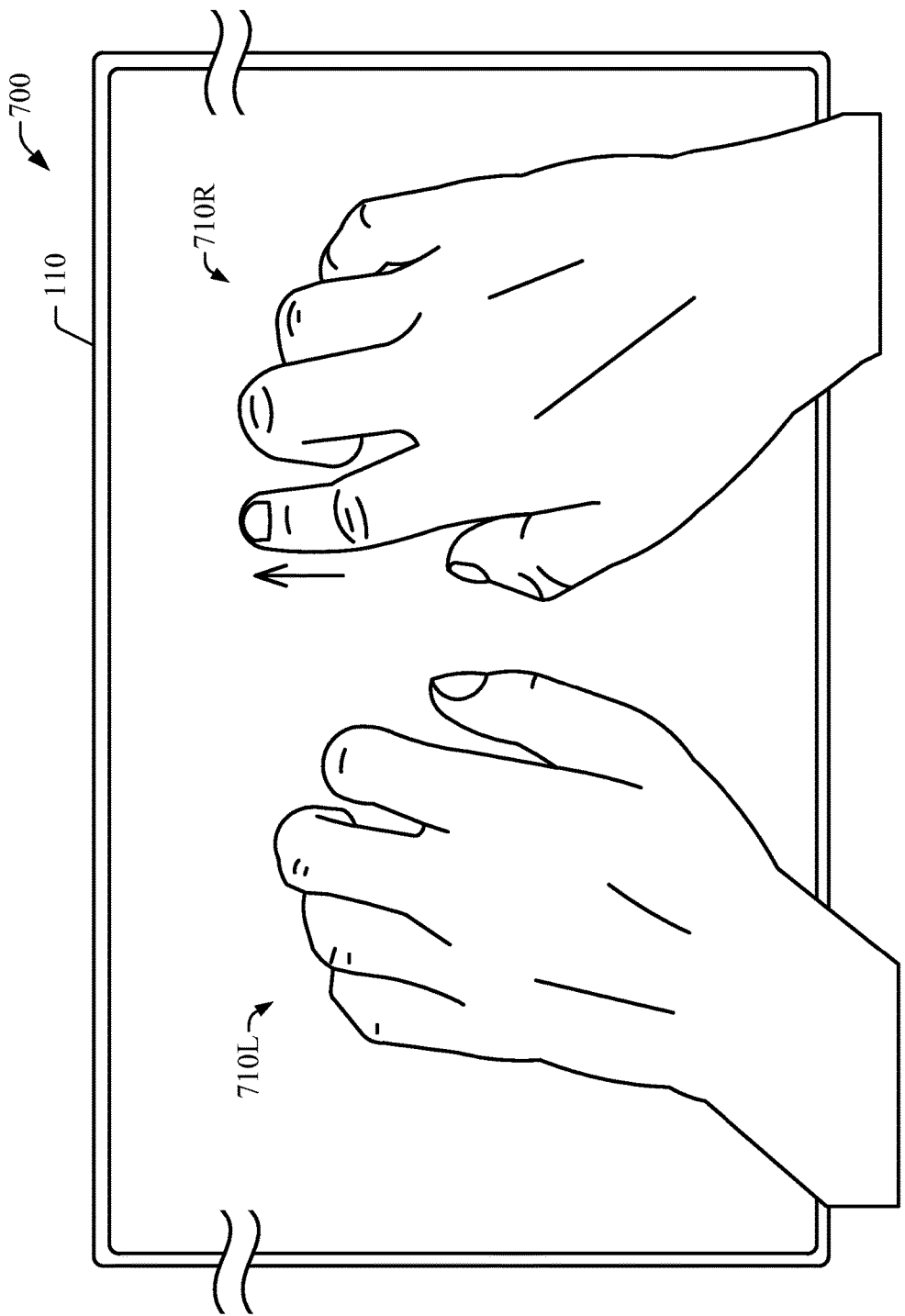
FIGS. 7A-7B illustrate other example finger press configurations in accordance with one or more aspects of the disclosure.
Figure 7B:
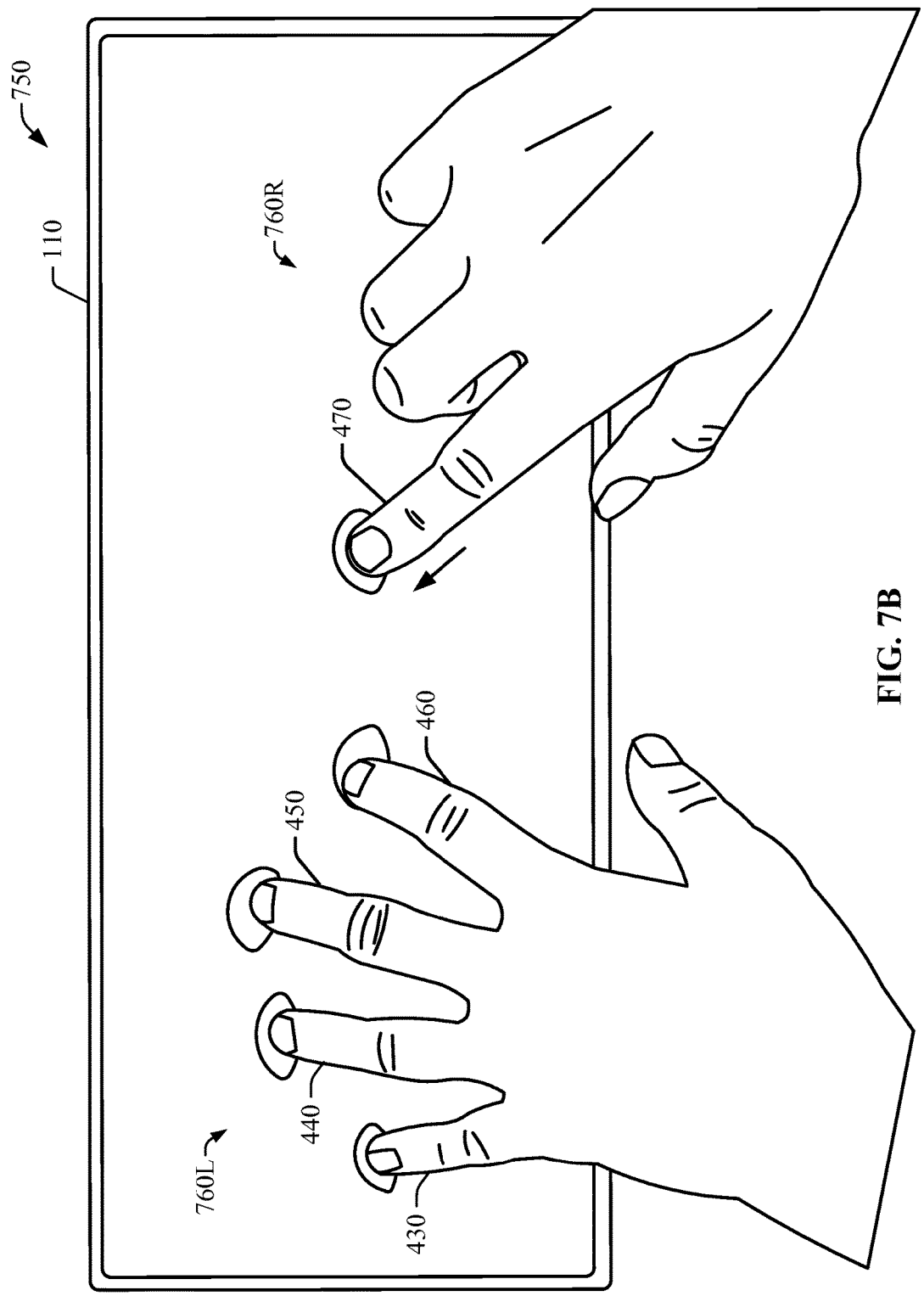

Based on the generalized home row, the computing device (e.g., computing device 410) can detect a change in the arrangement of the plurality of points of contact and can determine an updated arrangement of points of contact. For example, in a scenario in which the plurality of points of contact is associated with an N-finger press, the computing device can detect a transition from an arrangement associated with the N-finger press to another arrangement associated with an (N−1)-finger press. Such a transition can originate from a typing action in which an end-user lifts (or releases) one finger as part of a typing sequence based on a typing technique that relies or otherwise leverages the N-finger press. As described herein, the computing device can determine the specific finger (e.g., pointer finger, middle finger, annular finger, or pinky finger) included in the transition from the N-finger press to the (N−1)-finger press. In addition, the computing device can detect a transition from the (N−1)-finger press to the N-finger press, which can be associated with the typing sequence—e.g., the end-user returns placement of hand(s) and associated fingers to the initial N-finger press. It should be appreciated that as the typing sequence continues, the computing device can detect various transitions between the N-finger press and the (N−1)-finger press. As illustrated in FIGS. 7A-7B, a generalized home row can be associated with a four-press home row and the typing technique (e.g., touch typing) can rely upon or otherwise leverage changes in one point of contact related to an initial plurality of points of contacts—e.g., transitions between an 8-finger press and a 7-finger press (see FIG. 7A), or transitions between a 5-finger press and a 4-finger press (see FIG. 7B).

The computing device can detect other changes in the arrangement of the plurality of points of contacts. In one aspect, the computing device can detect a transition from the N-finger press to an (N−M)-finger press, where M is a natural number less than or equal to N−1 that represents a number of fingers lifted in a typing action or keying event. In addition, the computing device can detect a transition from the (N−M)-finger press to an (N−P)-finger press, where P is a natural number satisfying 1≤P≤M−1. The (N−P)-finger press can represent a number of fingers in contact with a surface in order to type an intended key or tile. For instance, in a scenario in which N=8, an end-user can lift (or release) two fingers (M=2) prior to effecting a 7-finger press (P=1) in order to type the intended tile, and then return to the initial 8-finger press.

As described herein, the computing device can determine a difference between the first arrangement of the plurality of points of contact and the updated arrangement and, in response, can select a specific indicia from the layout of indicia based at least on the difference. The specific indicia can represent or otherwise indicate one of the keys or tiles in the keyboard layout relative to the generalized home row. Accordingly, in one aspect, such difference can represent or otherwise indicate a "soft keystroke" event that can permit the computing device to select the specific indicia and, optionally, render the content associated with the indicia that is selected. In certain embodiments, the computing device can select the specific indicia based at least on a specific set of one or more fingers that are lifted prior to typing or keying a specific tile and the keyboard layout relative to the generalized home row. As an illustration, for initial 8-finger press, the computing device can detect a transition to a 7-finger press and the specific finger that is released. Based at least on such identification, the computing device can identify a portion of the keyboard layout that is likely to include the key or tile that is intended to be pressed. In one aspect, for a QWERTY keyboard layout, computing device can detect a transition (or change) from the 8-finger press to the 7-finger press, and can determine that the finger that is released is the middle finger in the end-user's left hand. Based on such determination the computing device can generate the portion of the QWERTY layout that is associated with the letters "E," or "X," as one of these letters is likely to be intended to be pressed or otherwise actuated by the end-user based on the determined release of the middle finger.

Figure 8:
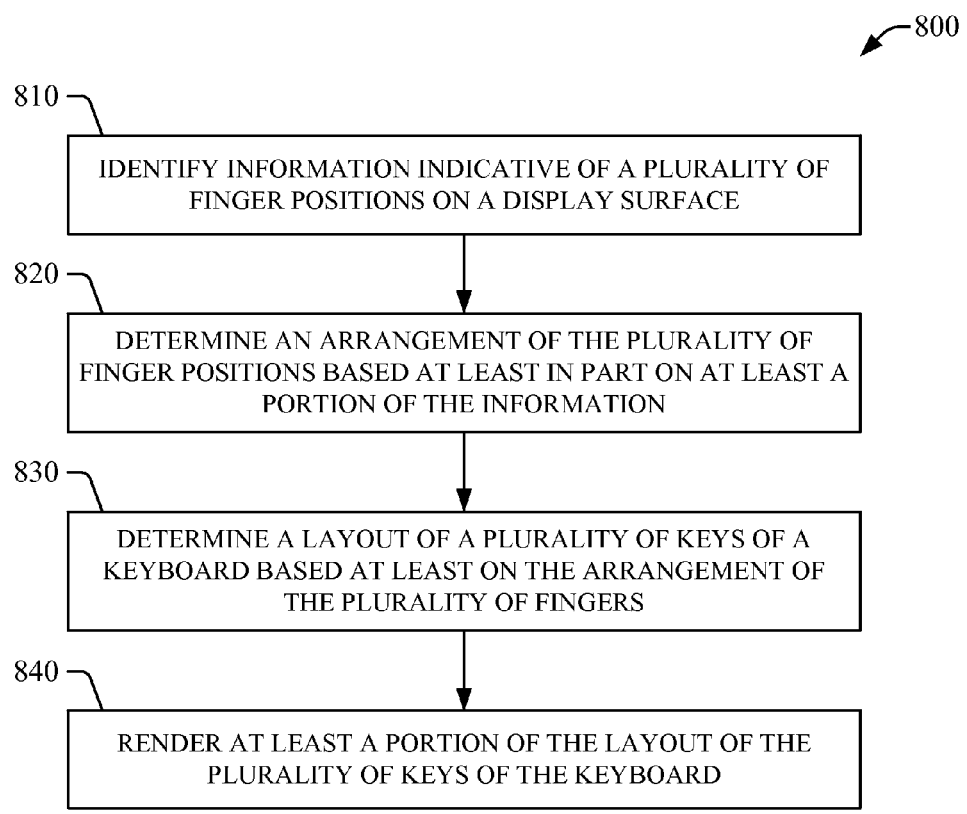
FIGS. 8-9 illustrate example methods in accordance with the one or more aspects of the disclosure.
Figure 9:
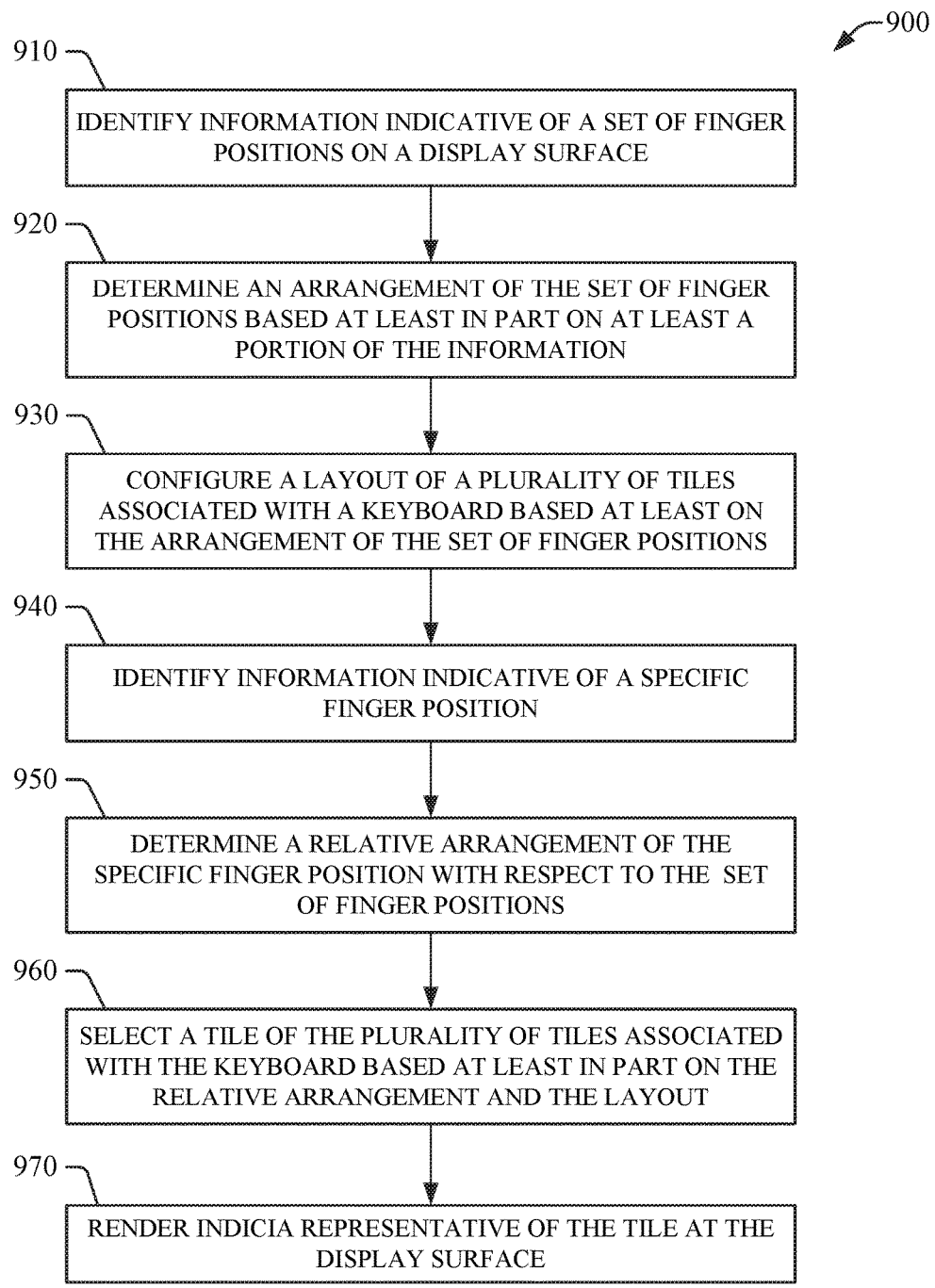

In view of the aspects described herein, example methods that can be implemented in accordance with the disclosure can be better appreciated with reference, for example, to the flowcharts in FIGS. 8-9. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks from that which are shown and described herein. For example, the various methods or processes of the disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more features or advantages described herein.

It should be appreciated that the methods of the disclosure can be retained on an article of manufacture, or computer-readable medium, to permit or facilitate transporting and transferring such methods to a computing device (e.g., a desktop computer; a mobile computer, such as a tablet, or a smartphone; a gaming console; a mobile telephone; a blade computer; a programmable logic controller; and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement the one or more methods. The code instructions can provide a computer-executable or machine-executable framework to implement the methods described herein.

FIG. 8 presents a flowchart of an example method 800 for customizing a layout of indicia (e.g., a keyboard layout) according to at least certain aspects of the disclosure. One or more computing devices having one or more processors or being functionally coupled to at least one processor can implement (e.g., compile, execute, compile and execute, etc.) one or more blocks of the example method 800. In one embodiment, for example, the computing device 410 or the computing device 510 can implement the subject example method. In other scenarios, one or more blocks of the example method 800 can be implemented in a distributed fashion by two or more computing devices contained in a system. Each of the two or more computing devices can have at least one processor or can be functionally coupled to at least one processor, where such processor(s) can implement at least one of the one or more blocks.

At block 810, information indicative of a plurality of finger positions on a display surface is identified. The display surface can be associated with (e.g., integrated into or coupled to) the computing device that implements the subject example method. Such a plurality can be associated with an N-finger press, with N>1, as described herein. Each of the finger positions can be associated with a point of contact on the display surface. In one aspect, acquiring such information can comprise detecting the plurality of finger positions. In certain embodiments, a sensing unit (such as a pressure sensor or a capacitance sensor) can detect at least one of the plurality of finger positions or associated at least one point of contact. The sensing unit (e.g., one of the sensing unit(s) 414) can be integrated into or otherwise functionally coupled to the computing device that implements the subject example method. At block 820, an arrangement of the plurality of finger positions is determined based at least in part on at least a portion of the information indicative of the plurality of finger positions on the display surface. As described herein, in one aspect, determining such arrangement can include determining one or more distances between respective pairs of finger positions of the plurality of finger positions. In addition, or in the alternative, determining such arrangement can comprise determining at least an angle between a line connecting two of the plurality of finger positions and a reference straight line (e.g., a line defined by an edge of a surface of a display device). At block 830, a layout of a plurality of keys of a keyboard can be determined based at least on the arrangement of the plurality of fingers. As described herein, in one aspect, the layout can define a size and/or an orientation of each key of the plurality of keys of the keyboard and a spacing between at least two of the plurality of keys of the keyboard. The size and/or the orientation of each key can be referred to as a spatial configuration (or configuration) of each key. In another aspect, each of the plurality of keys or indicia indicative thereof can be associated with respective predetermined content. At block 840, at least a portion of the layout of the plurality of keys of the keyboard can be rendered. In one aspect, at least the portion of such layout can be rendered at the display surface.

FIG. 9 presents a flowchart of an example method 900 for typing via a customized layout of indicia (e.g., a keyboard layout) according to at least certain aspects of the disclosure. One or more computing devices having one or more processors or being functionally coupled to at least one processor can implement (e.g., compile, execute, compile and execute, etc.) one or more blocks of the subject example method 900. In one embodiment, for example, the computing device 510 can implement the example method. In other scenarios, one or more blocks of the example method 900 can be implemented in a distributed fashion by two or more computing devices contained in a system. Each of the two or more computing devices can have at least one processor or can be functionally coupled to at least one processor, where such processor(s) can implement at least one of the one or more blocks.

At block 910, information indicative of a set of one or more finger positions on a display surface can be identified. The display surface can be associated with (e.g., integrated into or coupled to) the computing device that implements the subject example method. As described herein, such a set can be associated with an N-finger press, with N>1. At block 920, an arrangement of the set of one or more finger positions can be determined based at least in part on at least a portion of the information indicative of the set of one or more finger positions on the display surface. At block 930, a layout of a plurality of tiles associated with a keyboard can be configured based at least on the arrangement of the set of one or more finger positions. For example, the plurality of tiles can correspond to at least a portion of the characters in a QWERTY keyboard layout and the layout that is configured can correspond to an arrangement of such a portion. As described herein, in one aspect, the layout can define a configuration of each key of the plurality of keys of the keyboard (e.g., a size of each key of the plurality of keys and/or an orientation of each key of the plurality of keys) and a spacing between at least two of the plurality of keys of the keyboard. At block 940, information indicative of a specific finger position can be identified. In one aspect, the specific finger position can be included in a subset of one or more finger positions of the set of finger positions. In one aspect, the information indicative of the specific finger position can be identified in response to detection of specific typing actions, such as untouch and touch events, associated with interaction of an end-user with the computing device that implements the example method 900. In a scenario in which the set of one or more finger positions is associated with an N-finger press, the information indicative of the specific finger position can convey or otherwise indicate a specific finger that is released from the N-finger press. At block 950, a relative arrangement of the specific finger position with respect to other finger position(s) in the set of one or more finger positions can be determined. At block 960, a tile of the plurality of tiles is selected based at least on the relative arrangement that is determined and the layout that is configured. In one aspect, the tile can be selected based at least on the relative arrangement, the layout that is configured, and the specific finger that is released from the N-finger press. At block 970, indicia representative of the tile can be rendered at the display surface associated with the computing device that implements the subject example method.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read only memory (ROM); random access memory (RAM); magnetic disk storage media; optical storage media; flash memory, etc.

Embodiments of the operational environments and methods (or techniques) are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into onto a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "interface," "unit," "module," "pipe," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that provides, at least in part, the functionality of the electronic components. An interface can include input/output (I/O) components as well as associated processor, application, and/or other programming components. The terms "component," "environment," "system," "architecture," "interface," "unit," "module," and "pipe" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance the performance of user equipment or other electronic equipment.

In addition, in the present specification and annexed drawings, terms such as "store," storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques that can provide a customized layout of indicia, such as a customized keyboard layout. It is, of course, not possible to describe every conceivable combination of elements and/or methods for purposes of describing the various features of the disclosure, but it can be recognized that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:
1. A method, comprising:
    detecting, by a computing device comprising one or more processors, a first plurality of points of contact and a second plurality of points of contact on a display surface of the computing device, each of the first plurality of points of contact is associated with a respective finger of a first hand of an end-user of the computing device and each of the second plurality of points of contact is associated with a respective finger of a second hand of the end-user;
    determining, by the computing device, a first distance between two points of contact of the first plurality of points of contact;
    determining, by the computing device, a second distance between two points of contact of the second plurality of points of contact;
    determining, by the computing device, a first configuration of first indicia indicative of a first plurality of keys associated with a first portion of a keyboard layout, wherein determining the first configuration comprises determining a respective size of each of the first indicia based at least on the first distance;
    determining, by the computing device, a second configuration of second indicia indicative of a second plurality of keys associated with a second portion of the keyboard layout, wherein determining the second configuration comprises determining a respective size of each indicia of the second indicia based at least on the second distance; and determining, by the computing device, a first angle between a line connecting two points of contact of the first plurality of points of contact and a straight line parallel to a first edge of the display surface and orthogonal to a second edge of the display surface, wherein determining the first configuration further comprises determining a relative orientation of a third indicia of the first indicia with respect to a fourth indicia of the first indicia based at least on the first angle.

2. The method of claim 1, further comprising rendering, by the computing device, the first indicia and the second indicia on the display surface, wherein the first indicia combined with the second indicia represents a complete layout of the keyboard layout.

3. The method of claim 1, further comprising determining, by the computing device, a second angle between another line connecting two points of contact of the second plurality of points of contact and the straight line parallel to the first edge of the display surface and orthogonal to the second edge of the display surface.

4. The method of claim 3, wherein determining the second configuration further comprises determining a relative orientation of at least one indicia of the second indicia with respect to at least one other indicia of the second indicia based at least on the second angle.

5. The method of claim 1, further comprising:
determining a relative orientation between a first point of contact and a second point of contact of the first plurality of points of contact;
determining, based at least in part on the relative orientation between the first point of contact and the second point of contact, that a first key of the keys corresponds to the first point of contact; and
determining, based at least in part on the relative orientation between the first point of contact and the second point of contact, that a second key of the keys corresponds to the second point of contact.

6. A method, comprising:
identifying, by a computing device comprising one or more processors, information indicative of a plurality of finger positions on a display surface;
determining, by the computing device, an arrangement of the plurality of finger positions based at least in part on the information, wherein determining the arrangement of the plurality of finger positions comprises determining a distance between at least two of the plurality of finger positions; and
determining, at the computing device, a respective size and a relative orientation of each key of a keyboard and a spacing between at least two of the keys of the keyboard, wherein determining the respective size of a first key comprises determining the respective size of the first key based at least on the distance between the at least two of the plurality of finger positions, and wherein determining the relative orientation of a second key comprises determining the relative orientation of the second key based at least on an angle between a line connecting two points of contact of the plurality of finger positions and a straight line parallel to a first edge of a display surface of the computing device and orthogonal to a second edge of the display surface.

7. The method of claim 6, wherein determining the layout of the keys of the keyboard comprises updating a prior layout of the keys of the keyboard.

8. The method of claim 7, wherein the rendering comprises displaying the keys at another surface coupled to the display surface.

9. The method of claim 7, wherein the rendering comprises projecting the keys onto at least one of a portion of the display surface or at least a portion of one or more other surfaces.

10. The method of claim 6, further comprising rendering, by the computing device, at least a portion of a layout of the keys.

11. The method of claim 7, wherein the plurality of finger positions comprises a first finger position and a second finger position, and wherein determining the arrangement of the plurality of finger positions comprises determining a relative position of the first finger position with respect to the second finger position.

12. The method of claim 11, wherein the keys comprise a first key associated with the first finger position and a second key associated with the second finger position, and the method further comprises determining a relative orientation of the first key and the second key based at least on the relative position of the first finger position with respect to the second finger position.

13. The method of claim 6, further comprising:
determining a relative orientation between a first finger position and a second finger position of the plurality of finger positions;
determining, based at least in part on the relative orientation between the first finger position and the second finger position, that a first key of the keys corresponds to the first finger position; and
determining, based at least in part on the relative orientation between the first finger position and the second finger position, that a second key of the keys corresponds to the second finger position.

14. A device, comprising:
at least one memory device having instructions encoded thereon; and
at least one processor functionally coupled to the one or more memory devices and configured, by the instructions,
to identify information indicative of a plurality of finger positions on a display surface of the device;
to determine an arrangement of the plurality of finger positions based at least in part on the information, wherein determining the arrangement of the plurality of finger positions comprises determining a set of one or more distances between at least two of the plurality of finger positions; and
to determine a respective size of each key of a keyboard, a relative orientation of each key with respect to the other keys of the keyboard, and a spacing between at least two of the keys of the keyboard, the respective size of a first at least one key being based at least on the set of distances between the at least two of the plurality of finger positions, and the relative orientation of a second key being based at least on an angle between a line connecting two points of contact of the plurality of finger positions and a straight line parallel to a first edge of a display surface of the device and orthogonal to a second edge of the display surface.

15. The device of claim 14, wherein the plurality of finger positions is a first plurality of finger positions, the arrangement is a first arrangement, and the configuration is a first configuration, the at least one processor is further configured to detect a second plurality of finger positions, to determine second arrangement of the second plurality of finger positions, and to determine a configuration of the keys.

16. The device of claim 15, wherein the at least one processor is further configured to cause the device to display the keys at another surface coupled to the display surface of the device.

17. The device of claim 14, wherein the at least one processor is further configured to cause the device to render at least a portion of a layout of the keys.

18. The device of claim 14, wherein the plurality of finger positions comprises a first finger position and a second finger position, and wherein the at least one processor is further configured to determine a relative position of the first finger position with respect to the second finger position.

19. The device of claim 14, wherein the keys comprise a first key associated with the first finger position and a second key associated with the second finger position, and wherein the at least one processor is further configured to determine a relative orientation of the first key and the second key based at least on the relative position of the first finger position with respect to the second finger position.

20. The device of claim 14, wherein at least one processor is further configured, by the instructions,
   to determine a relative orientation between a first finger position and a second finger position of the plurality of finger positions;
   to determine, based at least in part on the relative orientation between the first finger position and the second finger position, that a first key of the keys corresponds to the first finger position; and
   to determine, based at least in part on the relative orientation between the first finger position and the second finger position, that a second key of the keys corresponds to the second finger position.

21. At least one computer-readable non-transitory storage medium having computer-executable instructions encoded thereon that, in response to execution, cause at least one processor to perform operations comprising:
   identifying information indicative of a set of finger positions on a display surface of a computing device;
   determining an arrangement of the set of finger positions based at least in part on the information;
   configuring a layout of a plurality of tiles associated with a keyboard based at least on the arrangement of the set of finger positions;
   identifying information indicative of a specific finger position, the information comprising a release of a specific finger from the arrangement of the set of finger positions and an identification of the specific finger as a pointer finger, a middle finger, an annular finger, or a pinky finger;
   determining a relative arrangement of the specific finger position with respect to the set of finger positions; and
   selecting a tile of the plurality of tiles associated with the keyboard based at least in part on the determined relative arrangement, layout, and the specific finger that is released from the arrangement of the set of finger positions.

22. The at least one computer-readable non-transitory storage medium of claim 21, the operations further comprising rendering indicia indicative of the selected tile at the display surface of the computing device.

* * * * *